(12) United States Patent
Gayde et al.

(10) Patent No.: US 8,689,334 B2
(45) Date of Patent: Apr. 1, 2014

(54) SECURITY PROTECTION FOR A CUSTOMER PROGRAMMABLE PLATFORM

(75) Inventors: Ruth Schaefer Gayde, Naperville, IL (US); Byron J. Williams, Chicago, IL (US)

(73) Assignee: Alcatel Lucent, Paris (FR)

( * ) Notice: Subject to any disclaimer, the term of this patent is extended or adjusted under 35 U.S.C. 154(b) by 760 days.

(21) Appl. No.: 11/712,092

(22) Filed: Feb. 28, 2007

(65) Prior Publication Data

US 2008/0209564 A1 Aug. 28, 2008

(51) Int. Cl.
G06F 11/00 (2006.01)
G06F 12/14 (2006.01)

(52) U.S. Cl.
USPC ........ 726/25; 726/1; 726/17; 726/22; 726/23; 726/24; 713/167; 713/153; 713/185; 713/188; 709/229; 370/352; 370/356

(58) Field of Classification Search
USPC ............ 726/1, 5–25; 713/185–188, 151, 166, 713/179
See application file for complete search history.

(56) References Cited

U.S. PATENT DOCUMENTS

| | | | |
|---|---|---|---|
| 6,272,641 B1 * | 8/2001 | Ji | 726/24 |
| 6,775,704 B1 * | 8/2004 | Watson et al. | 709/229 |
| 6,816,582 B2 * | 11/2004 | Levine et al. | 379/211.04 |
| 7,023,861 B2 * | 4/2006 | Makinson et al. | 370/401 |
| 7,284,274 B1 * | 10/2007 | Walls et al. | 726/25 |
| 7,451,486 B2 * | 11/2008 | Garg et al. | 726/23 |
| 7,475,405 B2 * | 1/2009 | Manganaris et al. | 719/318 |
| 7,577,420 B2 * | 8/2009 | Srinivasan et al. | 455/404.1 |
| 7,584,507 B1 * | 9/2009 | Nucci | 726/23 |
| 7,685,638 B1 * | 3/2010 | Buches | 726/22 |
| 7,716,729 B2 * | 5/2010 | Bhatia | 726/13 |
| 7,861,303 B2 * | 12/2010 | Kouznetsov et al. | 726/24 |
| 7,949,716 B2 * | 5/2011 | Alperovitch et al. | 709/206 |
| 7,996,544 B2 * | 8/2011 | Jakubik et al. | 709/229 |
| 2002/0059144 A1 * | 5/2002 | Meffert et al. | 705/51 |
| 2003/0105959 A1 * | 6/2003 | Matyas et al. | 713/168 |
| 2004/0034773 A1 * | 2/2004 | Balabine et al. | 713/168 |
| 2004/0107362 A1 * | 6/2004 | Ravishankar et al. | 713/201 |
| 2004/0133803 A1 * | 7/2004 | Rabin et al. | 713/200 |
| 2004/0225922 A1 * | 11/2004 | Susarla et al. | 714/38 |
| 2005/0069097 A1 * | 3/2005 | Hanson et al. | 379/88.12 |
| 2006/0037072 A1 * | 2/2006 | Rao et al. | 726/14 |
| 2006/0075084 A1 * | 4/2006 | Lyon | 709/223 |
| 2006/0104431 A1 * | 5/2006 | Emery et al. | 379/211.04 |
| 2006/0236402 A1 * | 10/2006 | Russell et al. | 726/25 |
| 2007/0061266 A1 * | 3/2007 | Moore et al. | 705/51 |
| 2007/0067823 A1 * | 3/2007 | Shim et al. | 726/2 |

(Continued)

OTHER PUBLICATIONS

Nicholas M Devito, Functionality and Structure of the Service Broker in Advanced Service Architectures, Apr. 1, 2005, Bell Labs Technical Journal, vol. 10, pp. 17-30.*

(Continued)

Primary Examiner — Nathan Flynn
Assistant Examiner — Viral Lakhia
(74) Attorney, Agent, or Firm — Fay Sharpe LLP

(57) ABSTRACT

A method of preventing a customer programmable device from causing security threats to itself or to a communication system is provided. The method includes establishing one or more thresholds by programming or configuring of the device, detecting whether one or more of the thresholds have been exceeded using one or more detection mechanisms, and taking action in response to each threshold that has been exceeded.

14 Claims, 3 Drawing Sheets

(56) References Cited

U.S. PATENT DOCUMENTS

| | | | |
|---|---|---|---|
| 2007/0094374 A1* | 4/2007 | Karia et al. | 709/223 |
| 2007/0097963 A1* | 5/2007 | Thermos | 370/352 |
| 2007/0121596 A1* | 5/2007 | Kurapati et al. | 370/356 |
| 2007/0201665 A1* | 8/2007 | Kocan et al. | 379/201.02 |
| 2007/0266426 A1* | 11/2007 | Iyengar et al. | 726/5 |
| 2008/0040801 A1* | 2/2008 | Buriano et al. | 726/22 |
| 2008/0098478 A1* | 4/2008 | Vaidya et al. | 726/24 |
| 2008/0120688 A1* | 5/2008 | Qiu et al. | 726/1 |

OTHER PUBLICATIONS

Kristin Kocan, A Novel Software Approach for Service Brokering in Advance Service Architectures, Jun. 5, 2006, Bell Labs Technical Journal, vol. 11, pp. 1-18.*

A Gouya, SCIM Implementation Issues in IMS Service Architecture, Jun. 2006, IEEE, vol. 6, pp. 3-5.*

* cited by examiner

SECURITY PROTECTION FOR A CUSTOMER PROGRAMMABLE PLATFORM

BACKGROUND OF THE INVENTION

This invention relates to a method and apparatus for preventing a customer programmable platform from causing security threats to itself or to a communication system. While the invention is particularly directed to the art of telecommunications, and will be thus described with specific reference thereto, it will be appreciated that the invention may have usefulness in other fields and applications.

By way of background, next generation service architectures are being designed to support a vibrant myriad of possibilities for creation and introduction of new services, many of which will use programmable platforms to deliver new services. For example, the Alcatel-Lucent Service Broker is a customer programmable platform that can be used by service providers to blend/mediate their IP Multimedia Subsystem (IMS) services. The customer-programmable nature of this platform introduces special security concerns for a service provider's network. These concerns are heightened given that the Service Broker is an integral part of the IMS architecture. As an example of the security threat, a malicious or poorly programmed service uploaded to the Service Broker could flood the network with Session Initiation Protocol (SIP) messages, effectively causing a denial of service attack on other network elements as they go into overload condition. Another threat is a service that puts the Service Broker itself into an overload condition, for example, with hanging processes. Even though these types of problems cannot be fully eliminated in a programmable platform, ideally the platform itself should have built-in safeguards to notify the platform user (i.e., the service provider) of possible undesirable behavior.

The present invention contemplates a new and improved method and apparatus that resolve the above-referenced difficulties and others by detecting and resolving suspicious message sending patterns and suspicious processes in a flexible way, suitable for the needs of a programmable platform.

SUMMARY OF THE INVENTION

In accordance with one aspect of the present invention a method of preventing a customer programmable device from causing security threats to itself or to a communication system is provided. The method includes establishing one or more thresholds by programming or configuring of the device, detecting whether one or more of the thresholds have been exceeded via one or more detection mechanisms, and taking action in response to each threshold that has been exceeded.

In accordance with another aspect of the invention an apparatus for preventing a customer programmable device from causing security threats to itself or to a communication system is provided. The apparatus includes means for establishing one or more thresholds in the device, means for detecting whether one or more of the thresholds have been exceeded via one or more detection mechanisms; and means for taking action in response to each threshold that has been exceeded.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
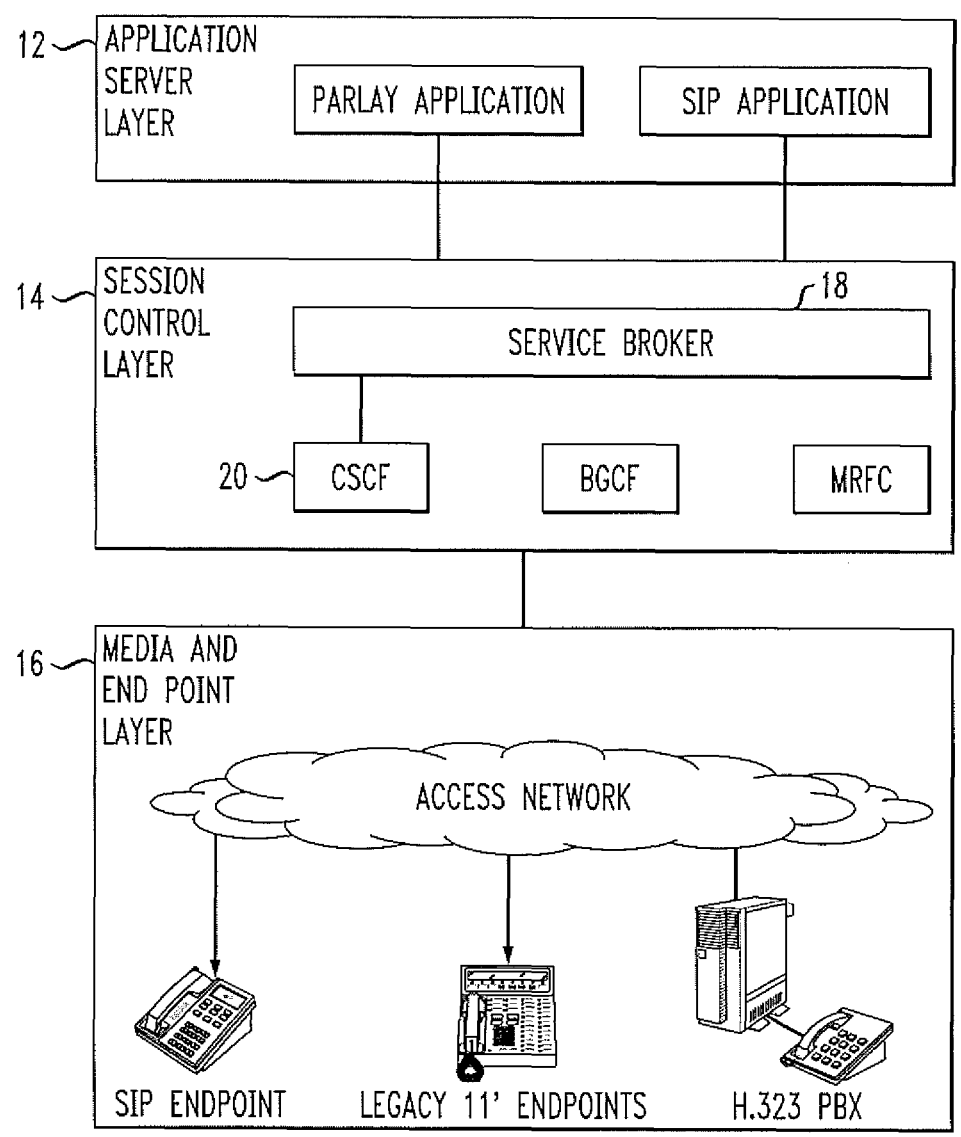
FIG. 1 depicts a communication system suitable for implementing aspects of the present invention.

Referring now to the drawings wherein the showings are for purposes of illustrating the exemplary embodiments only and not for purposes of limiting the claimed subject matter, FIG. 1 depicts a known communication system 10 suitable for implementing aspects of the present invention. The communication system 10 is described in greater detail, for example, in U.S. Patent Pub. No. 2006/0104431, which is incorporated herein by reference. As shown in FIG. 1, the communication system 10 generally comprises an IMS architecture that can support multiple application servers providing traditional telephony services and non-telephony services such as instant messaging (IM), push-to-talk, video streaming, multimedia messaging, etc.

The communication system 10 comprises at least three layers—an Application Server Layer 12, a Session Control Layer 14, and a Media and End Point Layer 16. If multiple application servers are used to provide services for end users, then some additional functionality is required to combine and/or broker these services. As shown, a customer programmable platform or device such as a Service Broker 18 may provide this functionality. The Service Broker functionality fills a role that is referred to as the Service Capability Interaction Manager (SCIM) in the IMS architecture. This service architecture can simultaneously support many different real-time communication applications.

However, additional service interworking or service brokering is needed to blend services and control service interaction. The Service Broker 18 resides between the core session layer and the Application Server Layer 12 and has corresponding interfaces to the applications. This provides critical functionality such as integrating multiple applications into meaningful service offerings, allowing participating applications to be unaware of each other, and providing programmability with an application programming interface (API) for combining services.

The communication system 10 indicates a logical representation of functions. The Service Broker 18 resides between the Call Session Control Function (CSCF) proxy server 20 and the application servers. However, the actual functionality may reside on an individual physical entity or may be co-located with another function or functions on a single physical entity. Examples would be to co-locate with the CSCF (or SoftSwitch in pre-IMS architectures), with a gateway (such as the Open Systems Architecture (OSA/Parlay gateway), or with an application on an application server.

It is also conceivable that some service brokering could be performed simultaneously in all these locations in a partitioned manner. The session control portion of the IMS architecture is Session Initiation Protocol (SIP) centric, in that the protocol of choice used while communicating between elements in Session Control Layer 14 is SIP. As such, the interface from the Service Broker 18 to the CSCF 20 is SIP.

A key aspect of the communication system 10 depicted in FIG. 1 is that the IMS architecture is equally suitable for wireless, wireline, and converged networks. The Service Broker 18 also manages the integration and coordination of services to control service interaction and/or to provide enriched end-user experiences. Further, the Service Broker 18 accommodates users who can span different endpoints, such as analog, softphones, or wireless phones, and can customize service presentation based on the user's endpoint capabilities, such as voice only, voice/data, or voice/data/multimedia. The Service Broker 18 can save and use variable user data and session context data to achieve multi-session awareness and manage simultaneous and sequential context-sensitive interactions.

In addition to the "service blending" capability, the Service Broker 18 can be used to share network services such as media servers across multiple applications by intercepting their commands and adapting them to a selected media server command interface, although other components in the IMS architecture could provide such sharing. Also, the Service Broker 18 may, in conjunction with other systems in the maintenance infrastructure, bring about the consolidation of information for billing and operations support systems and an abstracted view to the other elements in the network.

The Service Broker 18 functionality can be implemented in a non-SIP environment, such as a web services environment, providing that the following conditions of service blending can be utilized. A first condition is that multiple applications need to act on the same event/message. A second condition is that pre-defined, but programmable, logic, which has been referred to as corresponding to a "service package," designates how the event/message and subsequent messages are dispatched. The service package defines a specific composite service, made up of the action and interaction of subtending applications, potentially as well as application capabilities such as Presence, Location, and Policy. The Service Broker 18 would facilitate the addition of the corresponding code. In this usage, session contexts may be created by the logic as supported by the Service Broker. Session contexts would serve as execution-time entities that keep the context information for related user activity. Session contexts are preferably multiple session aware, see all the associated events and messages, and are used by the Service Packages for feature interaction control.

Figure 2:
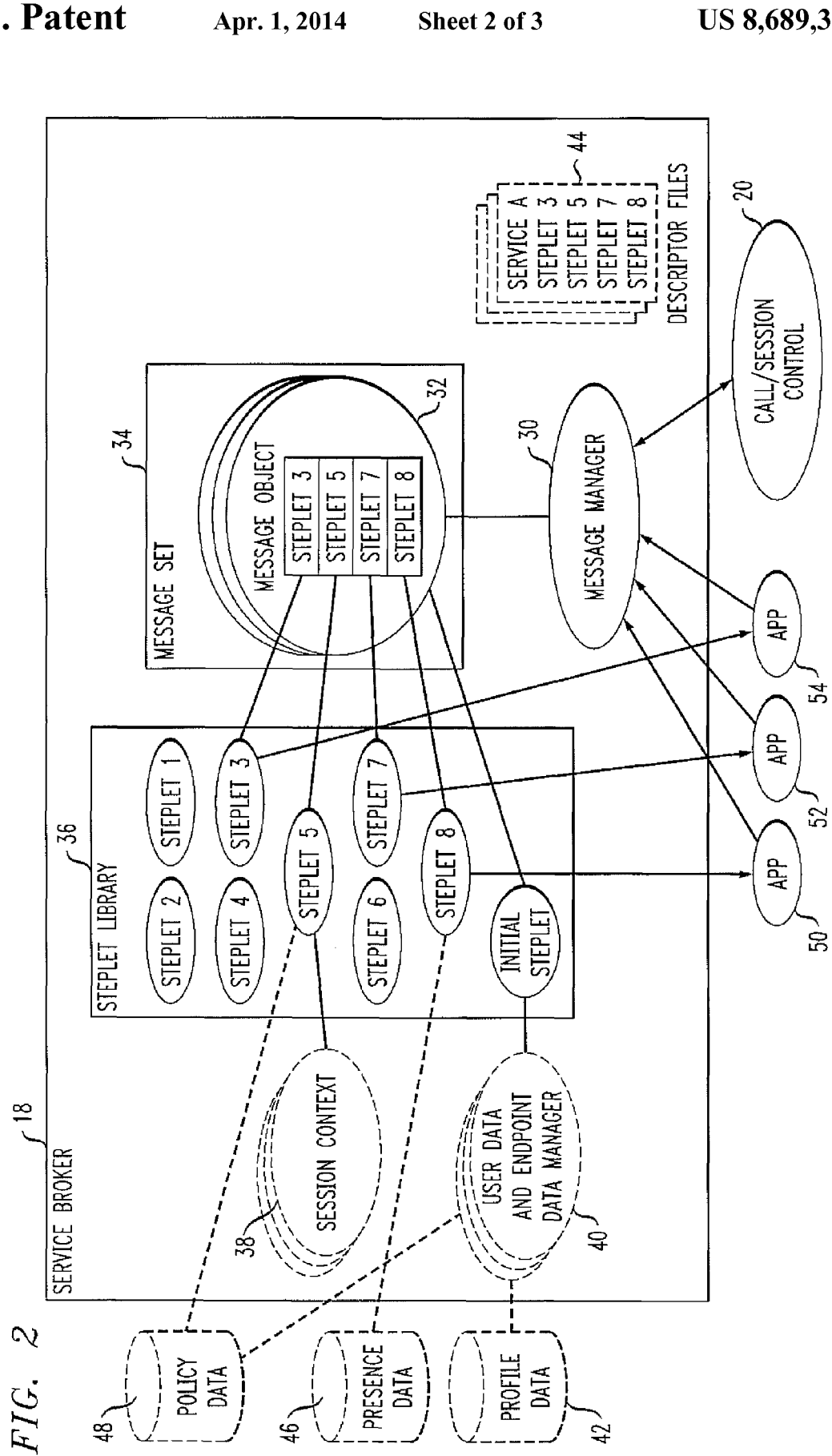
FIG. 2 depicts a more detailed view of the Service Broker shown in FIG. 1.

The essential functional modules of the Service Broker 18, comprising the steplet engine, are depicted in FIG. 2. A Message Manager 30 stimulates action within the Service Broker 18 as a result of an incoming message. The Message Manager 30 includes the message protocol stack, such as a SIP stack, and a dispatcher for the software elements called steplets that determine the feature interaction or service blending.

The Message Manager 30 creates a unique Message Object 32 for each request message received and appends it to the Message List. The Message Object 32 is created for each message received and all other information bound to that message, including the list of steplets for execution and any desired attributes. A Message Set 34 includes the list of all current Message Objects.

A Steplet and Class Library 36 generally includes the steplets and classes that programmers extend, implement, or use directly. A Session Context 38 is a structure for binding attribute data to session ID.

A User Data and Endpoint Data Manager 40 is a structure for obtaining user data and endpoint data, caching the data, and binding attribute data to user ID. The data may be obtained from a Profile database 42.

A number of Service Descriptor files 44 form an optional mechanism that associates a steplet ID or a list of steplet IDs with a defined feature interaction or service blending.

The steplet engine supports the operation of steplets, including their appropriate initialization, etc. Generally, steplet is a user-written class derived from a steplet base class. Steplets can perform many functions, including forwarding a particular request to an application server; sending a response, such as busy or redirect, for a particular request; sending a particular response to the next hop, sending an original request to another server instead of forwarding the request upstream; or contacting special non-SIP servers, such as a Presence Server 46, a Location Server, a Policy Server 48, a Web Server, a database, a media resource server, or any other server, via any form of RMI/RPC (Remote Method Invocation/Remote Procedural Call) protocol. Steplets are designed to support dynamic sequencing: they can name their successor steplet and they can easily share attribute data by means of the attribute binding structures in the steplet engine.

Further, steplets can wait for SIP messages without tying up thread resources by arrangement of capabilities within the steplet engine, specify the next steplet for a message, set or get attribute data, and implement service interaction control or service blending logic ranging from simple sequencing to the embodiment of complex algorithms or interfaces.

The Service Broker 18 is generally SIP-based and provides the Service Capability Interaction Manager (SCIM) functionality in IP Multimedia Subsystem and other Next Generation service architectures. The Service Broker 18 may be used not only to manage service interaction, but also to provide enhanced end user experience by blending multiple applications (50, 52, 54) with each other and with Presence, Location, and Policy functions, and by incorporating multi-session awareness.

With the Service Broker 18, a minimal set of applications can be configured in a multiplicity of ways as its elements are brought into play, mixing and matching them with each other. The Service Broker API for supporting the degree of flexibility needed for the Service Broker 18 to support unique service combinations is typically Java-based. The various functional sub-components in the steplet engine that are needed to enable these Service Broker capabilities are also Java-based.

Using the Service Broker API, service providers or their agents can incorporate service/application interaction and blending rules in Java programs that can be dynamically loaded into the Service Broker 18. The API enables maximum expressive freedom without restricting the creative talents of programmers needed to provide uniqueness and flexibility in interaction management, blending, and multi-session awareness. Providing an API based on standard Java gives the benefit of the excellent selection of off-the-shelf and open source Java Integration Development Environments (IDEs), test environments, and other tools. The Java development shop used for providing the Service Broker programs can continue to use the tools (e.g., for editing and compiling) they find most productive; they do not need to learn and convert to a specialized set of tools (although a new library will need to be learned).

The Service Broker 18 has a unique role in an IMS network, such as the communication system 10, because this network element is programmable by the service provider or another third party, whereas other network elements are generally programmed only by their respective vendors. The service packages provided by the service provider present the need for a platform infrastructure security framework to guard against malicious or poorly programmed service packages that are uploaded to the Service Broker 18. As an example of the security threat, a malicious or poorly programmed service uploaded to the Service Broker 18 could flood the network 10 with SIP messages, causing a denial of service attack on other network elements as they go into overload condition. Even though this type of problem cannot be fully eliminated in a programmable platform, ideally the platform itself should have built-in safeguards to notify the platform user (service provider) of possible bad behavior, and possibly also stop the behavior.

In order to further illustrate the need to provide a security framework for the Service Broker SCIM function specifically and programmable platform in general, we will take a closer look at the need for the SCIM within the IMS architecture and the important role it plays.

Customers want real time communications services to work together in a seamless fashion. This allows for bundling and interworking of services to provide new blended capabilities. For example, end users in a lengthy IM session may wish to spawn a voice session without the bother of looking up phone numbers and establishing a separate voice session. In another example, when an end user is engaged in a push-to-talk session, the incoming voice calls may result in call waiting treatment only for certain calling parties. As described in the preceding section, the IMS service architecture can simultaneously support and sequence many different real time communication applications. However, additional service interworking or service brokering—provided by a SCIM—is needed to provide complex blended services.

In an IMS network such as the communication system 10 shown in FIG. 1, determining the sequence and invocation of applications for a given call may be done in two places: the serving call session control function (S-CSCF), which does filtering, and the SCIM which is able to provide fuller service brokering. The SCIM is optional and can be assigned on a per end user basis. The S-CSCF incorporates filtering in compliance with the 3GPP specifications. The capabilities of the SCIM, on the other hand, are not specified by 3GPP, as the SCIM functionality is viewed as being a specialized application server and functionality of application servers is not specified.

Programming the network infrastructure significantly enhances its flexibility and favors fast deployment of new protocols, but also introduces serious security risks. It is crucial to protect the whole distributed infrastructure, especially its availability in case of denial of service attacks, and to prevent customized blends from causing denial of service attacks on other element.

The key features of the Service Broker application programming interface (API) are that it is easy to use, that it is based on the novel steplet construct, and that it is useable with any standard Java Integration Development Environment (IDE). The goal of the engine/API design is to move the cumbersome, repetitive functions to the Service Broker engine so that it is only the unique logic of the blend and any unique interface software that needs to be added via the API. The result is that very simple blends can happen with only one line of code (such as trivial sequencing of SIP servers), and that some quite complex, product-grade deployable blends can be completed in as little as 300 lines of code. As mentioned, the software implementing a blend is referred to as a Service Package. Service Packages are made up of steplets and other Java classes that work together to bring about the desired blended service.

The Service Package contains the customer programmed blending logic that combines various applications, sub-capabilities within applications, presence, location, policies, etc. The customer programmed code contained in a Service Package determines how multiple applications act on the same message and provides the sequenced tasks, based on the roles and capabilities of the applications. The Service Broker engine dispatches messages to and from the appropriate Service Packages in accordance with the design of the combined service for the subscriber.

In the Service Broker 18, a Service Package is implemented with a set of steplets and, if desired, other classes; the sequence of steplets can either be determined within the steplets themselves or by providing a sequenced list of steplets. The steplets communicate (incorporating specialized interfaces as necessary) with the applications and/or their sub-capabilities and/or enablers, etc. The coordination of the applications is based on the steplet code and sequence. The sequence is dynamic since steplets can change the sequence of steplets. This architecture provides rich dispatching, supporting mix and match of the applications—whether new or existing, their sub-capabilities, and enablers, with web servers, content servers, databases, etc. Service Packages are stored on a repository (typically a web server) in a protected domain accessible by the deployed Service Broker 18. Upon first reference to a particular steplet or class (e.g., identified in user data retrieved from the Home Subscriber Server (HSS)), the Service Broker 18 will retrieve the code from the repository and dynamically load it.

The manufacturer of the Service Broker 18 generally does not control the content of the steplets or the service packages but does provide the platform and software infrastructure. In a worst case scenario, a poorly or maliciously programmed steplet provided by the service provider could lead to system overload of the Service Broker 18 or other network elements. Although the manufacturer would not generally test or certify Service Packages provided by the service provider, the built-in safeguards described herein would provide a measure of protection against such security threats that are particular to customer-programmable platforms.

We will now address the possible anomalous behaviors (i.e., security threats) that can occur in customer programmable platforms such as the Service Broker 18, including message spewing, looping conditions, hung steplets, stuck messages and the like.

Message Spewing—Given that the Service Broker 18 can behave as a back-to-back user agent with the ability to create and send SIP messages, it is conceivable that a wayward steplet could possibly send an unacceptable number of SIP message to another element in the network. Sending too many messages to other network entities (flooding), could put other network entities into overload leading to unwanted conditions on the overall network. Unfortunately, this is a difficult problem to detect given the programmable nature of the Service Broker 18, because one person's "spewing" of messages may be another person's "wonderful service." In developing a detection mechanism for this condition, one has to keep in mind that not all services (steplets) are the same. A condition of spewing defined and detected in one steplet may not be applicable to another steplet. In fact, the other steplet my very well want to send a large number of messages based on the application it is delivering. Therefore, the proper message-sending profile for each service may vary tremendously based on the programmable nature of the platform.

Looping conditions—A steplet caught in a looping condition can wreak a lot of havoc on the programmable Service Broker platform. Looping steplets can cause CPU overload conditions on the Service Broker platform, which can greatly limit the ability of the Service Broker 18 to process sessions. The steplets will also continue to use Java resources while in the looping conditions. Therefore, it is important to provide a mechanism that will detect looping steplets.

Hung steplets—Unlike looping steplets, hung steplets are not actively running and using CPU. However, they are still a concern because too many hung steplets could put the platform into overload while continuing to consume other resources. As such, detecting hung steplets on the platform is important.

Stuck messages—Steplets operate on messages. The Service Broker Message Manager is responsible for managing messages as they flow in and out of the Service Broker 18. These messages are placed in message queues while waiting for steplets to be executed on the message. It is the responsibility of the last executing steplet to remove the message from the message queue once it has determined that all actions for this message have been completed. Messages can be left in the queue after bad customer-provided steplets have been stopped or removed prior to the steplet removing the message from the queue. As such, detecting stuck messages is another important anomalous behavior that needs to be detected.

Figure 3:
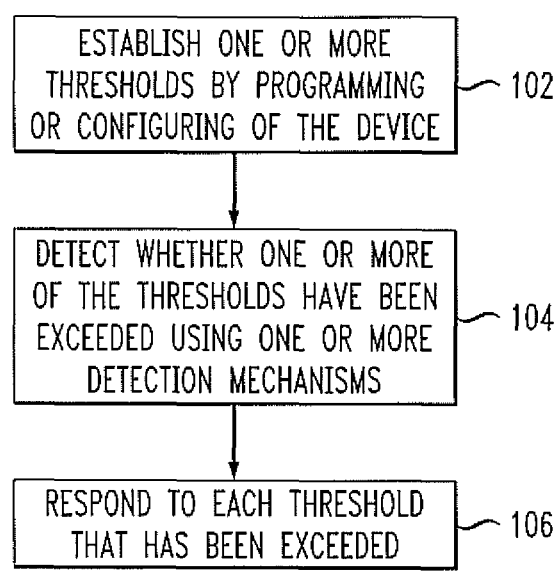
FIG. 3 is a flowchart of a method of securing a customer programmable platform according to aspects of the present invention.

In view of these possible anomalous behaviors, a method of securing a customer programmable device such as the Service Broker 18 has been developed. A flowchart of the method is shown in FIG. 3. The method includes establishing one or more thresholds by programming or configuring of the device 18 (102), detecting whether one or more of the thresholds have been exceeded using at least one detection mechanism (104), and taking action in response to each threshold that has been exceeded (106). These steps will be explained in greater detail below.

Thresholding Policies

Multiple layers of thresholds can be defined for the Service Broker 18. There are defined as system-wide thresholds, which apply to all steplets, and per-steplet thresholds that are tunable to the expected behavior of individual steplets. All thresholds are tunable to accommodate the specific service blends used by the service provider. At the system level, the default value for all thresholds for sending messages would be zero, requiring explicit action to set them to non-zero levels based on expected steplet behavior.

Per-steplet thresholds may be programmed or built into specific steplets. The Service Broker API may provide Java classes to define certain thresholds to the service programmer, enabling the programmer to build in the proper checks on the steplet. The programmer is in the best position to calculate the appropriate thresholds for his/her steplet, given the understanding of expected steplet behavior. Per-steplet thresholds may also be configured at the system level, with the system-wide per-steplet threshold applying to all steplets.

The service provider creates service packages with steplets, and steplets are in a sense "nested," as one steplet may call other steplets. The starting point for a subscriber session is defined by the subscriber's HSS entry, which contains the assignment of the service package steplet in the Service Broker 18 for that subscriber. The service package steplet would correspond to a particular service offering that is marketed by the service provider. As an example, let us assume that the subscriber has purchased a "Business Road Warrior" service package and that this corresponds to a service package steplet that may call steplets for presence, simultaneous ringing, and email, each of which is its own steplet or set of steplets. While each individual steplet will have its own thresholds, the service package steplet may have thresholds that are more restrictive than the subtending steplets, depending on the expectation of the service package. In this service package, the simultaneous ringing capability needs to find only one person, so perhaps a maximum of only 5 INVITEs would be necessary, since this service provider limits one subscriber to a maximum of 5 devices. However, the simultaneous ringing steplet itself may allow, say, 20 or more INVITEs because it is designed to accommodate applications such as blasting out calls to a whole group of people (for example, calling a fleet of tow trucks to see who could respond to a broken down car). The threshold programmed into the simultaneous ringing steplet might be 20 INVITEs, but the threshold programmed into the service package steplet for the Business Road Warrior may be only 5 INVITEs. Thus, the more restrictive threshold will take precedence.

Examples of individual thresholds include:
Maximum number of INVITEs sent for this steplet
Maximum number of INVITEs sent to a specific destination for this steplet
Maximum ratio of inbound messages to outbound messages for this steplet
Maximum CPU time for this steplet
Maximum length of time for this steplet to remain in a wait state The control of the values of these built-in thresholds remains with the programmer of the steplet. The values are determined by the programmer as part of the steplet design, and the programmer for the service package steplet has the responsibility to consider whether the service package steplet requires any thresholds to be more restrictive than the thresholds in the steplets it calls. The settings for these thresholds would be made visible (read-only) at a maintenance interface related to the handling of each steplet.

System wide thresholds are set during system configuration and may be applied to each steplet individually, or may be applied to the aggregation of all steplets running concurrently over some time period.

Further, system wide per-steplet thresholds may be defined or configured for each of the individual thresholds mentioned above. Accordingly, the Service Broker 18 may include a graphical user interface (GUI) to assist the user in configuring such thresholds. These system values are chosen so that all steplets would be expected to fall below the threshold. Built-in per-steplet thresholds could be more restrictive than these system level thresholds. For example, assume there are two kinds of service blends implemented on the Service Broker 18, and further assume that a steplet for one of the blends would expect to send only a maximum of 5 INVITEs, while a steplet for a different blend might expect to send as many as 20 INVITEs. For this combination of service blends and steplets, the system wide threshold would be set at 20 INVITEs per steplet in order to accommodate all services.

An additional threshold for the number of times a particular steplet has been killed over a particular time period would also be defined or configured. A suggested action for this anomalous behavior would be to declare a security alarm.

The system wide thresholds would be updateable only by maintenance personnel with a security level access privilege via the GUI, while the built-in per steplet thresholds would be set by the steplet programmer, who may not have a higher privilege level. Thus, the system wide threshold enables some checks and balances in defining the security mechanisms, since it requires the involvement of someone with security level privileges to set a threshold that is separate from the programmer's built-in threshold. In other words, it enforces a sanity check of the programmer's steplet. Thus, if a programmer with malicious intent provides a steplet constructed to send a flood of INVITEs into the network, the system level threshold set in good faith would prevent this misbehavior, even if the built-in threshold is very high. Presumably, to determine the proper system-level thresholds, the person with security level access would discuss the required threshold levels with each of the steplet programmers. Additionally, the system level thresholds could be determined by checking the read-only built-in threshold values for each of the individual steplets.

System wide aggregate thresholds can be defined or configured at the system level, as an additional mechanism for preventing steplet misbehavior. Measurements against these thresholds are taken across all steplets running concurrently, over a particular time period. The benefit of this type of threshold is that it may detect undesirable characteristics of the behavior of the combination of currently running service packages. Examples of system wide aggregate thresholds include:

Maximum number of INVITEs sent over XX seconds
Maximum number of messages of any time sent over YY seconds to a particular destination The system wide aggregate thresholds require security level privilege to administer, similar to the privilege required for administering the system wide per-steplet thresholds. Special care is needed in determining these values, requiring knowledge of network traffic models for the services involved. A threshold value that is too restrictive will not accommodate peak traffic levels, leading to too many alarms or too many events written to the log files, which may consequently be ignored, defeating their intended purpose.

Detection Mechanisms

Detection mechanisms are defined as the means by which the Service Broker 18 detects anomalous behaviors running in the Service Broker 18. In order for detection mechanisms to actually detect the anomalous behavior, specific policies or thresholds are needed to support the detection mechanism. These thresholds are defined as the comparable measures used by the detection mechanism to determine if the behavior is in fact anomalous behavior. For example, there could be a detection mechanism that detects looping steplets. In order for the detection mechanism determine if the steplet is actually looping, there would be a measurable threshold to compare against the actual running time of the steplet in order to make a determination on whether the steplet is in fact looping. This measurable threshold would need to be provided at system level or steplet level and be tunable. The detection mechanism compares the actual running time of the steplet to the threshold. If the actual run time exceeds the defined threshold, then the mechanism could take some kind of corrective or informational action (attempt to restart steplet, log something in log file, alarm, etc.).

The Service Broker 18 may utilize the infrastructure in the existing API to define detection mechanisms for anomalous behaviors. Currently, the Service Broker API supports a callback mechanism. There are several interfaces and methods that are part of the callback mechanism, including the following: the StepletCallBack interface, which is contained in the com.lucent.steplet package, the SBCallback interface, which is contained in the com.lucent.servicebroker package, and the MessageCounter and the MessageCounterSteplet methods, which are contained in the com.lucent.systemsteplet package. The callback mechanism allows the ability for steplets (i.e. a class) to gain control when an event happens in the processing of a message—even if the event happens AFTER the steplet returns. Some of the methods currently supported by the StepletCallBack interface, SBCallback interface and the com.lucent.systemsteplet package are listed below.

StepletCallBack interface methods include:
startSteplet(StepletMessage m, StepletListItem s) called by "steplet worker thread" just before it invokes a steplet on a message.
endSteplet(StepletMessage m, StepletListItem s) called by "steplet worker thread" when it has finished invoking a steplet on a message.
stepletNotFound(StepletMessage m, StepletListItem s) called by "steplet worker thread" when it cannot load a steplet that was on the steplet list.
stepletThrewException(StepletMessage m, StepletListItem s, Exception e) called by "steplet worker thread" when a steplet throws an uncaught exception SBcallback interface methods include:
sendRequest(SBMessage sbMsg, SBSentRequest sentReq) called by SBMessage.sendRequest( ) after it has successfully forwarded the SIP request sipReq for the SBMessage sbMsg.
sendResponse(SBRequest sbReq, Response sipResp, SBResponse sbResp) called by SBRequest.sendResponse( ) after it has successfully sent a response for the SBRequest sbReq
fwdRequest(SBRequest sbReq, SBSentRequest sentReq) called by SBRequest.fwdRequest( ) after it has successfully forwarded a SIP request for the SBRequest sbReq.

com.lucent.systemsteplets include:
MessageCounter( ) Maintain a count of SIP messages, by method, status code, and received vs. sent.
MessageCounterSteplet( ) A steplet which arranges to count incoming and outgoing SIP messages. To use, just invoke this steplet on every incoming message.
getCounters( ) Return a snapshot of the current counters, as an array.

By leveraging the callback mechanism along with the above mentioned methods/class/steplets, it is possible to provide a general purpose monitoring steplet for the Service Broker platform. This monitoring steplet can use the callback mechanism's methods/classes/steplets in order to provide a detection mechanism for anomalous behaviors. The monitoring steplet would be the first steplet executed prior to any customer provided steplets and could request for a callback whenever a subsequent steplet, operating on a message, performs any of the actions defined by the associated methods/class/steplets.

The Service, Broker monitoring steplet takes advantage of the callback facility to monitor outgoing messages. If, for example, one of the first steplets in the list is the monitoring steplet, that steplet could ask for a callback whenever a subsequent steplet operating on the message, sends a request. That monitoring steplet using callback can keep track of the number of messages being sent. The monitoring steplet can compare the number of messages being sent to the defined system/steplet level thresholds in order to determine if the steplet is sending an excessive number of messages. For example, suppose the steplet list for a message is MonitorSteplet
StepletX The MonitorSteplet may be provided in the Service Broker infrastructure and may be pre-pended in front of each steplist. In such case, it could be removed easily by the service provider. Now, suppose that the MonitorSteplet wants to compare the number of messages being sent by StepletX to the defined threshold whether system level or steplet level. The StepletX steplet will call the MessageCounterSteplet whenever it receives or sends a message. This will arrange for a count to be kept on all incoming and outgoing messages. The MonitorSteplet will be called back when messages are sent and it will retrieve the current message count by calling getCounters( ). The MonitorSteplet steplet will then compare the number of messages sent to the threshold to determine if the StepletX is in a spewing-like condition. Once a determination is made, the MonitorSteplet can take action to flag the condition.

An audit daemon that leverages the Service Broker API can be used to detect hung/looping steplets as well as stuck messages. The Service Broker audit daemon can use method and classes defined in the com.lucent.steplet package.

StepletWorkerManager Class
getAllWorkers( ) Return an array with all worker threads
StepletWorker Class
getWorkerStatus( ) Return Status object with the steplet and message that this worker is currently processing.

The Service Broker audit daemon can be scheduled to run periodically or on demand. The audit daemon would periodically call the StepletWorkerManager.getAllWorkers( ), which will give an array of workers (StepletWorkers) that are currently running steplets. For each worker, the audit daemon will call getWorkerStatus( ), which will return the following:

Time worker started running steplet (0=>idle worker)
Steplet class name & parameters
Message that steplet is working The audit daemons will subtract the start time from the current time, and raise an alarm if the time exceeds the define system level or steplet level threshold. In addition, the audit daemons will provide the offending steplet name along with the message that the steplet was working on. The audit daemon also has the ability to run the StepletWorkerManager.restartWorker( ), which restarts the stuck worker.

The audit daemon can also be extended to detect stuck messages using methods and classes in com.lucent.steplet package.

StepletMessage Class
getAllMsgs( ) Return a StepletMessage[ ] with all the messages currently in the system
getArriveTS( ) Return time when message was created To detect stuck message behavior can the audit daemon can periodically call StepletManager.getAllMsgs( ). This call will return an array of all StepletMessages currently active in the Service Broker 18. For each message, the audit daemon can call getArrivalTS( ) to retrieve the time when the message entered the Service Broker 18. The daemon can then subtract the arrival time from current time to get the time-in-SB. If the time-in-SB exceeds the system level threshold, then the audit daemon can raise an alarm. The audit daemon can also attempt to unstick the message—wake it up, or send an error response.

Next, we will discuss some examples of how the Service Broker 18 will detect and mitigate denials of service conditions directed at other network elements or at the Service Broker 18.

In the first example, assume that there is a steplet whose defined mission is to determine presence. There is a presence server in the network, and this presence steplet sends a SIP SUBSCRIBE message to the presence server to ask for future updates of any information about a particular user. When the user's presence information changes, the presence server sends a NOTIFY message to the Service Broker 18 to inform it of the change.

Assume further that the programmer for this presence steplet is a disgruntled employee intent on causing harm in the network at some future date. The programmer sets a time bomb in the steplet to set up a loop to continuously send malicious nonsense INVITE messages to the S-CSCF session control element when the future date arrives (spewing), even though this steplet's stated purpose is related to SUBSCRIBE and NOTIFY messages only, and not INVITEs. In this case, the S-CSCF, which normally handles large numbers of INVITEs anyway, will try to process all of these nonsense INVITEs, thus falling into an overload situation at the denial of service attack. This is especially egregious because there may be no element capable of throttling between the Service Broker 18 and the S-CSCF.

If the detection mechanisms and thresholds described herein are deployed on the Service Broker 18, then this kind of DoS attack may be prevented. The DoS attack would not show up in any lab testing of this malicious programmer's steplet, because it was set to go off at a future date. But the system level thresholds may detect the anomalous behavior:

The system level thresholds for sending INVITEs will be exceeded, causing action to alert the service provider. This will occur even if this presence steplet has not declared any threshold for the INVITE message. The system level thresholds for looping may also detect the anomalous condition.

As another example, there may be a situation where hung steplets are waiting for a response. The hung steplet behavior can occur when a steplet that has been placed in the "wait" state never receives a stimulus to begin executing. This condition is not as detrimental as a steplet that is looping. Nonetheless, hung steplets will have an impact on the Service Broker 18. A steplet that goes into a "wait" actually frees up its resources while in the "wait" state. In fact, the main reason of going into a "wait" state is to free up Java resources. However, there are some resources involved to manage the list of steplets that are in the "wait" state. As such, a mechanism to ensure that steplets do not remain in the "wait" forever or become hung is an important mechanism. The hung steplet condition can be a result of a steplet sending a message to an Application Server and then placing itself on the "wait" list. If for some reason the Application Server does not respond back to the steplet, the steplet could potentially be left in the wait state if the programmer's logic does not deal adequately with not receiving responses while in the "wait" state. The audit daemon would detect this condition and act accordingly to alert the system of the condition and take corrective actions.

Possible Actions Upon Exceeding Threshold

When the various thresholds are exceeded by a steplet or a combination of steplets, then the Service Broker 18 may take one or more specific actions such as (a) writing to a Service Broker error log, (b) killing the offending steplet and pegging a "killed steplet" count, (c) writing to the Security log, or (d) declaring a security alarm. A Service Broker error log is a general purpose log provided for anomalous events. Killing the offending steplet and pegging a "killed steplet" count would stop the steplet from operating for this session but would not affect this steplet in other sessions. After some number of times that this steplet is killed over a particular time period, an additional action could be taken such as declaring an alarm. A Security log is a log for security-related events, which is typically viewable only by someone with security privileges. A security alarm is a special category of alarms reserved for security-related events.

The type of threshold (built-in, system wide per steplet, system wide aggregation) may also be a factor in what action is taken. For example, a built-in threshold may have hard-coded actions, while a system-level threshold may have tunable actions. If the system level per-steplet threshold is set to the same value as the built-in threshold, but each has different actions, then both actions would occur when the threshold is exceeded.

For aggregate thresholds exceeded, the service provider may wish to account for the bursty nature of the system load by declaring a security alarm only after an aggregate threshold has been exceeded repeatedly over some length of time. For example, in Table 1 below, the service provider has decided that for one threshold, a measurement count will be pegged, and an alarm will be declared after there have been 10 instances of exceeding the aggregate threshold. For another threshold, a security alarm will be declared after only two instances of exceeding the threshold.

TABLE 1

| | Peg count | Declare Security Alarm | Declare alarm after exceeding maximum in this number of consecutive cycles |
|---|---|---|---|
| Aggregate INVITEs sent over 15 minute interval exceeded threshold | Yes | No | 10 |
| Aggregate number of steplets killed over 15 minute interval exceeded threshold | Yes | Yes | 2 |

Security Related to Provisioning Thresholds

As mentioned earlier, special security level privileges would be required to update system level thresholds. Additionally, every time one of the thresholds is modified, an event may be written to the security log detailing the time, action, and login identifier of the person who made the change. The role-based access control concept allows the service provider to assign specific roles to login IDs, based on the expected duties of the person with the login. This scheme uses the principle of least privilege, where a person is allowed to do only those tasks that are essential to his/her job.

Some portions of the above description were presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to systems for performing the operations herein. These systems may be specially constructed for the required purposes, or they may comprise one or more general-purpose computers selectively activated or reconfigured by one or more computer programs stored in the computer(s). Such computer program(s) may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method comprising:
    determining measurements of operating behaviors of one or more steplets during operation of the one or more steplets on a programmable device, the one or more steplets providing services to a user;
    establishing one or more thresholds indicating one or more anomalous operating behaviors of the one or more steplets, the one or more thresholds comprising an individual threshold for a steplet, a system wide threshold, a system wide per steplet threshold or a system wide aggregate threshold;
    comparing the thresholds with the measurements to detect the one or more anomalous behaviors;
    taking action in response to detecting the steplet with anomalous behavior, the action comprising writing to a Service Broker error log, killing an offending steplet, or pegging a killed steplet count.

2. The method of claim 1, wherein the programmable device comprises a Service Broker that uses the steplets.

3. The method of claim 2, wherein the Service Broker includes a graphical user interface for viewing the thresholds.

4. The method of claim 1, wherein the anomalous behavior comprises at least one of message spewing, looping conditions, hung steplets, and stuck messages.

5. An apparatus comprising:
at least one server configured to:
  establish one or more thresholds indicating one or more anomalous operating behaviors of one or more steplets on a programmable device, the one or more thresholds comprising an individual threshold for a steplet, a system wide threshold, a system wide per steplet threshold or a system wide aggregate threshold;
  detect anomalous behavior of the one or more of the steplets by whether one or more of the thresholds have been exceeded by corresponding measurements of operating behaviors of the one or more steplets;
  take action in response to each threshold that has been exceeded, the action comprising writing to a Service Broker error log, killing an offending steplet, or pegging a killed steplet count.

6. The apparatus of claim 5, wherein the programmable device comprises a Service Broker that uses the one or more steplets.

7. The apparatus of claim 6, wherein the Service Broker includes a graphical user interface for viewing the thresholds.

8. The apparatus of claim 5, wherein the at least one server is further configured to:
  write to a Service Broker error log;
  kill an offending steplet and peg a killed steplet count; and,
  write to a security log, or declare a security alarm.

9. The apparatus of claim 5, wherein the at least one server is further configured to:
  write to a Service Broker error log;
  kill an offending steplet and peg a killed steplet count; and,
  write to a security log, or declaring a security alarm.

10. The apparatus of claim 5, wherein the security threats include message spewing, looping conditions, hung steplets, and stuck messages.

11. The system of claim 5, wherein the steplets are operated in response to a session initiation protocol (SIP) message for a service received from an end user device over a communication network and, during operation, coordinate with one or more application servers to provide the service to the end user device.

12. A system comprising:
at least one server configured to:
  receive one or more steplets, each of the steplets performing one or more functions when executed;
  receive a session initiation protocol (SIP) message for a service from a user device over a communication network;
  in response to the SIP message, execute at least one of the received steplets to provide the service to the user, the execution including communication with one or more application servers used by the service;
  during execution of the at least one steplet, determine measurements of one or more operating behaviors of the at least one steplet;
  establish one or more thresholds for the at least one steplet, the one or more thresholds indicating anomalous behavior of the at least one steplet, the one or more thresholds comprising an individual threshold for a steplet, a system wide threshold, a system wide per steplet threshold or a system wide aggregate threshold;
  compare the thresholds with the measurements to detect anomalous operating behavior of the at least one steplet;
  in response to detecting abnormal operating behavior of the at least one steplet, taking action, the action comprising writing to a Service Broker error log, killing an offending steplet, pegging a killed steplet count.

13. The system of claim 12, wherein the abnormal operating behavior comprises at least one of message spewing, looping conditions, hung steplets, and stuck messages.

14. The system of claim 12, wherein the SIP message is received through a call session control function (CSCF) proxy server.

* * * * *